(12) United States Patent
Cave et al.

(10) Patent No.: US 9,226,202 B2
(45) Date of Patent: Dec. 29, 2015

(54) METHOD AND APPARATUS OF FEEDBACK SIGNALING

(71) Applicant: INTERDIGITAL PATENT HOLDINGS, INC., Wilmington, DE (US)

(72) Inventors: Christopher R. Cave, Dollard-des-Ormeaux (CA); Diana Pani, Montreal (CA); Paul Marinier, Brossard (CA); Vincent Roy, Longueuil (CA); Eldad M. Zeira, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/870,012

(22) Filed: Apr. 25, 2013

(65) Prior Publication Data

US 2013/0242944 A1 Sep. 19, 2013

Related U.S. Application Data

(63) Continuation of application No. 12/408,440, filed on Mar. 20, 2009, now Pat. No. 8,457,066.

(60) Provisional application No. 61/038,582, filed on Mar. 21, 2008.

(51) Int. Cl.
*H04W 36/00* (2009.01)
*H04W 36/18* (2009.01)
*H04L 1/00* (2006.01)

(52) U.S. Cl.
CPC .......... *H04W 36/0055* (2013.01); *H04W 36/18* (2013.01); *H04L 1/0026* (2013.01)

(58) Field of Classification Search
CPC ....... H04L 1/0026; H04L 1/18; H04L 1/1812; H04L 1/0028; H04L 1/0073; H04L 5/0055; H04L 5/0057; H04W 52/286; H04W 36/0055; H04W 36/18; H04B 17/0067; H04B 17/0042; H04B 7/0632
USPC .................. 370/335, 437, 516, 332
See application file for complete search history.

(56) References Cited

U.S. PATENT DOCUMENTS 8,144,667 B2 3/2012 Dominique et al.
2004/0179493 A1* 9/2004 Khan ............................ 370/332
(Continued)

FOREIGN PATENT DOCUMENTS

CN 1719940 A 1/2006
JP 2006-025438 A 1/2006
(Continued)

OTHER PUBLICATIONS

3rd Generation Partnership Project (3GPP), R1-02-0435, "TR 25.858 V 1.1.0", Rapporteur, 3GPP TSG RAN1#23, Feb. 18-22, 2002.
(Continued)

*Primary Examiner* — Kwang B Yao
*Assistant Examiner* — Syed M Bokhari
(74) *Attorney, Agent, or Firm* — Condo Roccia Koptiw LLP

(57) ABSTRACT

A method and apparatus of feedback signaling using a high speed dedicated physical control channel (HS-DPCCH) includes transmitting to a first cell a first uplink feedback signal that includes channel quality information (CQI) associated with the first cell A second uplink feedback signal that includes CQI information associated with a second cell is transmitted to the second cell.

17 Claims, 4 Drawing Sheets

(56) References Cited

U.S. PATENT DOCUMENTS

| | | | |
|---|---|---|---|
| 2005/0068990 | A1* | 3/2005 | Liu .............................. 370/516 |
| 2006/0007889 | A1 | 1/2006 | Khan |
| 2006/0199577 | A1 | 9/2006 | Ramakrishna et al. |
| 2007/0177555 | A1 | 8/2007 | Brueck et al. |
| 2008/0123601 | A1* | 5/2008 | Malladi et al. ................ 370/335 |
| 2008/0161003 | A1* | 7/2008 | Brueck et al. ................ 455/437 |
| 2008/0268785 | A1 | 10/2008 | McCoy et al. |
| 2008/0285477 | A1 | 11/2008 | Kuroda et al. |
| 2009/0201885 | A1 | 8/2009 | Kuroda et al. |
| 2010/0246562 | A1 | 9/2010 | Yamada et al. |
| 2010/0265840 | A1 | 10/2010 | Catreux-Erceg et al. |
| 2013/0336254 | A1 | 12/2013 | Imamura et al. |

FOREIGN PATENT DOCUMENTS

| | | |
|---|---|---|
| JP | 2008-530896 A | 8/2008 |
| WO | WO 2006/043712 A1 | 4/2006 |
| WO | WO 2006-088301 A1 | 8/2006 |
| WO | WO 2007/023787 A1 | 3/2007 |
| WO | WO 2007/136002 A1 | 11/2007 |
| WO | WO 2008/021573 A2 | 2/2008 |
| WO | WO 2008/054775 A2 | 5/2008 |

OTHER PUBLICATIONS

3rd Generation Partnership Project (3GPP), R1-050324, "Proposal for Supporting Real Time Service Over HSDPA", Lucent Technologies, 3GPP TSG-RAN WG1, Beijing, China, Mar. 31, 2005, 6 pages.

3rd Generation Partnership Project (3GPP), R2-052528, "HSDPA Re-Pointing", Samsung, 3GPP TSG-RAN Meeting# 48bis, Cannes, France, Aug. 10-Oct. 14, 2005, 6 pages.

3rd Generation Partnership Project (3GPP), R2-052568, "Enhanced HSDPA Re-pointing Scheme", Qualcomm Europe, 3GPP TSG-RAN WG 2, Cannes, France, Oct. 10, 2005, 9 pages.

3rd Generation Partnership Project (3GPP), R2-052986, "HSDPA Re-Pointing", Philips, 3GPP TSG-RAN WG 2, Meeting #49, Seoul, Korea, Nov. 7-11, 2005, 4 pages.

3rd Generation Partnership Project (3GPP), R2-080148, "Resource Release Mechanisms for CELL_FACH E-DCH", Infineon, 3GPP TSG-RAN WG2, Meeting#60bis, Sevilla, Spain, Jan. 14-18, 2008, 3 pages.

3rd Generation Partnership Project (3GPP), R2-080371, "HS-DSCH Serving Cell Change Performance in Urban Canyon Environments", Qualcomm Europe, 3GPP TSG-RAN WG2, Meeting#60bis Sevilla, Spain, Jan. 15-19, 2008, 1-6.

3rd Generation Partnership Project (3GPP), R2-080785, "HS-PDSCH Serving Cell Change Enhancements", Ericsson, 3GPP TSG-RAN WG2, Meeting#61, Sorrento, Italy, Feb. 11-15, 2008, 1-3.

3rd Generation Partnership Project (3GPP), R2-081015, "Improving Reliability of HS-PDSCH Serving Cell Change Procedure", Qualcomm Europe, 3GPP TSGRAN WG2, Meeting#61, Sorrento, Italy, Feb. 11-15, 2008, 1-8.

3rd Generation Partnership Project (3GPP), TS 25 308 V7.9.0, "Technical Specification Group Radio Access Network, High Speed Downlink Packet Access (HSDPA), Overall Description, Stage 2 (Release 7)", Dec. 2008, 51 pages.

3rd Generation Partnership Project (3GPP), TS 25.212 V3.11.0, "Technical Specification Group Radio Access Network, Multiplexing and Channel Coding (FDD) (Release 1999)", Sep. 2002, 62 pages.

3rd Generation Partnership Project (3GPP), TS 25.212 V4.6.0, "Technical Specification Group Radio Access Network, Multiplexing and Channel Coding (FDD) (Release 4)", Sep. 2002, 62 pages.

3rd Generation Partnership Project (3GPP), TS 25.212 V5.10.0, "Technical Specification Group Radio Access Network, Multiplexing and Channel Coding (FDD) (Release 5)", Jun. 2005, 72 pages.

3rd Generation Partnership Project (3GPP), TS 25.212 V6.10.0, "Technical Specification Group Radio Access Network, Multiplexing and Channel Coding (FDD) (Release 6)", Dec. 2006, 84 pages.

3rd Generation Partnership Project (3GPP), TS 25.212 V7.10.0, "Specification Group Radio Access Network, Multiplexing and Channel Coding (FDD) (Release 7)", Mar. 2009,103 pages.

3rd Generation Partnership Project (3GPP), TS 25.212 V7.7.0, "Technical Specification Group Radio Access Network, Multiplexing and Channel Coding (FDD) (Release 7)", Nov. 2007, 103 pages.

3rd Generation Partnership Project (3GPP), TS 25.212 V8.1.0, "3rd Generation Partnership Project, Technical Specification Group Radio Access Network, Multiplexing and Channel Coding (FDD) (Release 8)", Mar. 2008,103 pages.

3rd Generation Partnership Project (3GPP), TS 25.212 V8.5.0, "Technical Specification Group Radio Access Network, Multiplexing and Channel Coding (FDD) (Release 8)", Mar. 2009,107 pages.

3rd Generation Partnership Project (3GPP), TS 25.214 V3.12.0, "Technical Specification Group Radio Access Network, Physical Layer Procedures (FDD) (Release 1999)", Mar. 2003, 52 pages.

3rd Generation Partnership Project (3GPP), TS 25.214 V4.6.0, "Technical Specification Group Radio Access Network, Physical Layer Procedures (FDD) (Release 4)", Mar. 2003, 53 pages.

3rd Generation Partnership Project (3GPP), TS 25.214 V5.11.0, "Technical Specification Group Radio Access Network, Physical Layer Procedures (FDD) (Release 5)", Jun. 2005, 51 pages.

3rd Generation Partnership Project (3GPP), TS 25.214 V6.11.0, "Technical Specification Group Radio Access Network, Physical Layer Procedures (FDD) (Release 6)", Dec. 2006, 60 pages.

3rd Generation Partnership Project (3GPP), TS 25.214 V7.11.0, "Technical Specification Group Radio Access Network, Physical Layer Procedures (FDD) (Release 7)", Mar. 2009, 87 pages.

3rd Generation Partnership Project (3GPP), TS 25.214 V7.8.0, "Technical Specification Group Radio Access Network, Physical Layer Procedures (FDD) (Release 7)", Mar. 2008, 85 pages.

3rd Generation Partnership Project (3GPP), TS 25.214 V8.1.0, "Technical Specification Group Radio Access Network, Physical Layer Procedures (FDD) (Release 8)", Mar. 2008, 87 pages.

3rd Generation Partnership Project (3GPP), TS 25.214 V8.5.0, "Technical Specification Group Radio Access Network, Physical Layer Procedures (FDD) (Release 8)", Mar. 2009, 92 pages.

3rd Generation Partnership Project (3GPP), TS 25.308 V5.7.0, "Technical Specification Group Radio Access Network, High Speed Downlink Packet Access (HSDPA) Overall Description, Stage 2 (Release 5)", Dec. 2004, 28 pages.

3rd Generation Partnership Project (3GPP), TS 25.308 V6.4.0, "Technical Specification Group Radio Access Network, High Speed Downlink Packet Access (HSDPA); Overall Description; Stage 2 (Release 6)", Mar. 2007, 29 pages.

3rd Generation Partnership Project (3GPP), TS 25.308 V7.6.0, "Technical Specification Group Radio Access Network, High Speed Downlink Packet Access (HSDPA), Overall Description, Stage 2 (Release 7)", Mar. 2008, 50 pages.

3rd Generation Partnership Project (3GPP), TS 25.308 V7.9.0, "Technical Specification Group Radio Access Network, High Speed Downlink Packet Access (HSDPA) Overall Description, Stage 2 (Release 7)", Dec. 2008, 51 pages.

3rd Generation Partnership Project (3GPP), TS 25.308 V8.1.0, "Specification Group Radio Access Network, High Speed Downlink Packet Access (HSDPA), Overall Description, Stage 2 (Release 8)", Mar. 2008, 50 pages.

3rd Generation Partnership Project (3GPP), TS 25.308 V8.5.0, "Technical Specification Group Radio Access Network, High Speed Downlink Packet Access (HSDPA), Overall Description, Stage 2 (Release 8)", Mar. 2009, 61 pages.

3$^{rd}$ Generation Partnership Project (3GPP), R1-082532, "Control channel support for HSDPA Dual-Cell operation", Philips, NXP, 3GPP TSG RAN WG1, Meeting #53bis, Warsaw, Poland, Jun. 30-Jul. 4, 2008, 4 pages.

* cited by examiner

METHOD AND APPARATUS OF FEEDBACK SIGNALING

CROSS REFERENCE TO RELATED APPLICATIONS

This application is a continuation of U.S. patent application Ser. No. 12/408,440 filed Mar. 20, 2009, which claims the benefit of U.S. Provisional Application No. 61/038,582, filed Mar. 21, 2008, which is incorporated by reference as if fully set forth.

FIELD OF INVENTION

This application is related to wireless communications.

BACKGROUND

High speed downlink packet access (HSDPA) was introduced in Release 5 of the third generation partnership project (3GPP) specifications in order to provide high data rates in the downlink to packet data users in a universal mobile telecommunications system (UMTS). These high data rates may be achieved by increasing the spectral efficiency using concepts such as adaptive modulation and coding (AMC), fast physical layer retransmissions such a hybrid automatic repeat requests (H-ARQ), and fast scheduling for base stations called Node Bs.

In an HSDPA system, there can be occasions when a user equipment (UE) transitions from one cell to another. This transition is referred to as a handover. It is desirable during a handover to maintain cellular communication without interruption. In an HSDPA system, a UE may monitor a high speed shared channel in a single cell, or a "serving HS-DSCH cell". During handover, the UE transitions from communicating via a "source" Node B to a new serving HS-DSCH cell, (e.g., target cell/Node B). This procedure is referred to as a serving cell HS-DSCH cell change. However, HSDPA does not support soft or softer handover, where the UE simultaneously receives downlink data from multiple cells, i.e. multiple Node Bs.

In order to support the handover process, the UE continuously monitors the signal strengths of the serving cell and neighboring cells. Once the signal strength measured on the monitored reference channel of a neighboring cell exceeds the signal strength of the serving cell, the UE may signal to a radio network controller (RNC) associated with one or more of the Node Bs that a change of best cell event has occurred. This may be reported via a radio resource control (RRC) "MEASUREMENT REPORT event 1D" that contains the measured value and the cell identification (ID).

Upon the receipt of the RRC MEASUREMENT REPORT event 1D, the serving RNC (SRNC) determines whether or not to perform a handover to a new cell. The SRNC request the controlling RNC (CRNC) to allocate HS-DSCH resources, (e.g., HS-DSCH radio network temporary identifier (H-RNTI), high speed shared control channel (HS-SCCH) codes, HARQ resources, and the like) for the UE in the target cell. This may be performed via radio network subsystem application part (RNSAP) or Node B application part (NBAP) messages. Once the resources are reserved, the CRNC provides information to the SRNC, which transmits an RRC handover message to the UE that includes the radio access parameters required for the UE to begin monitoring the target cell. The RRC handover message may also include an activation time for the handover to take place.

Since the RRC handover message is sent to the UE via the source Node B over the high speed shared channel, a delay that is associated with the HS-DSCH serving cell change procedure may cause a failure of the RRC handover message transmission. Consequently, the rate of dropped calls may increase. In order to address this issue, it has been proposed to transmit a handover command in the target cell or in both the source and target cells, since the UE may be closer to the target cell when the handover situation is imminent. However, there is currently no ability to send feedback information for more than one cell at a time, which the inventors have recognized may cause unreliability and poor performance issues where the RRC handover message is transmitted in more than one cell. Additionally, with feedback being limited to a single cell, UEs that are designed to receive data from more than one cell at a time may perform less than optimally.

It would therefore be beneficial to provide a method and apparatus for feedback signaling.

SUMMARY

A method and apparatus of feedback signaling using a high speed dedicated physical control channel (HS-DPCCH) is disclosed. The method includes transmitting to a first cell a first uplink feedback signal that includes channel quality information (CQI) associated with the first cell. A second uplink feedback signal that includes CQI information associated with a second cell is transmitted to the second cell.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
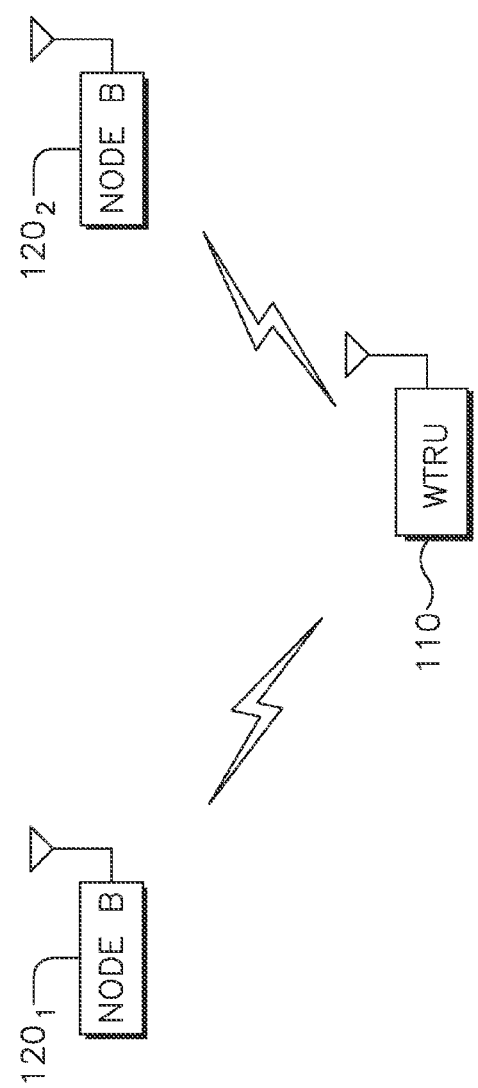
FIG. 1 shows an example wireless communication system including a wireless transmit/receive unit (WTRU) and a plurality of Node Bs.

FIG. 1 shows an example wireless communication system 100 including a WTRU 110 and a plurality of Node Bs 120 (designated $120_1$ and $120_2$). As shown in FIG. 1, the WTRU 110 is in communication with the Node Bs 120. For purposes of example, the WTRU 110 may be in a serving cell with Node B $120_1$ and Node B $120_2$ may be in a target cell neighboring the cell that Node B $120_1$ is in. Accordingly, the WTRU 110 may be in, or approaching, a handover situation between the source Node B $120_1$ and transitioning to a handover with Node B $120_2$. Furthermore, The Node B $120_1$ may be operating in a source cell during a handover operation. For example, the WTRU 110 may receive an indication from the source cell that the target cell has a greater ranking than the source cell, which initiates a handover.

Alternatively, the WTRU 110 and Node Bs 120 may be in operating in a dual or multi-cell operation. In this case, the WTRU 110 may simultaneously receive on two or more carrier frequencies from either one of the Node Bs 120. Accordingly, in the context of dual or multi-cell operation, where a "source cell" is mentioned below, it may be used interchangeably with an anchor cell in dual or multi-cell operation, and a "target cell" may refer to a secondary cell in dual or multi-cell operation. It should also be noted that, although an example configuration of WTRU 110 and Node Bs 120 is depicted in FIG. 1, any combination of wireless and wired devices may be included in the wireless communication system 100.

Figure 2:
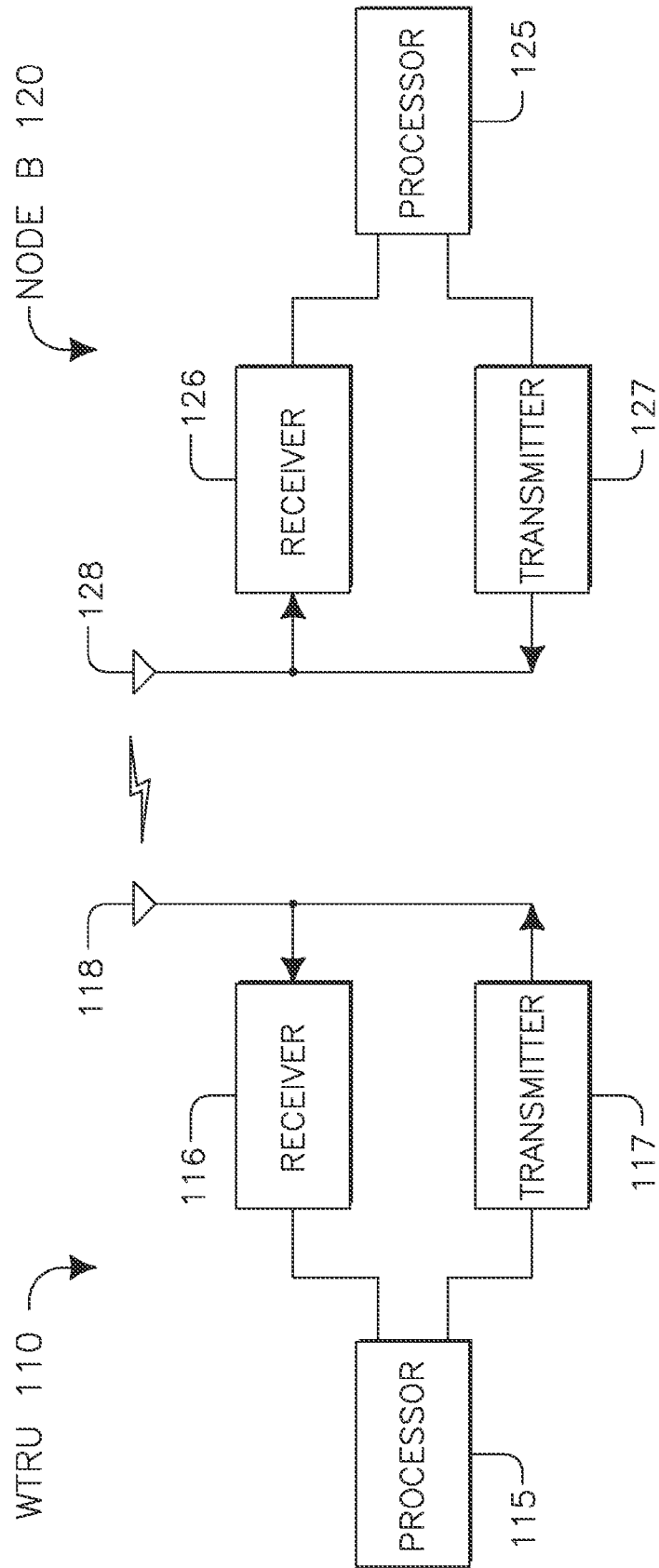
FIG. 2 is an example functional block diagram of the WTRU and a Node B of FIG. 1.

FIG. 2 is an example functional block diagram 200 of a WTRU 110 and the Node B 120 of the wireless communication system 100 of FIG. 1. As shown in FIG. 2, the WTRU 110 is in communication with the Node B 120.

In addition to other components that may be found in a typical WTRU, the WTRU 110 includes a processor 115, a receiver 116, a transmitter 117, and an antenna 118. The receiver 116 and the transmitter 117 are in communication with the processor 115. The antenna 118 is in communication with both the receiver 116 and the transmitter 117 to facilitate the transmission and reception of wireless data. The processor 115 of the WTRU 110 is configured to perform a method of uplink feedback signaling.

In addition to other components that may be found in a typical Node B, the Node B 120 includes a processor 125, a receiver 126, a transmitter 127, and an antenna 128. The receiver 126 and the transmitter 127 are in communication with the processor 125. The antenna 128 is in communication with both the receiver 126 and the transmitter 127 to facilitate the transmission and reception of wireless data. The processor 125 of the Node B 120 is configured to perform a method of uplink feedback signaling.

Figure 3:
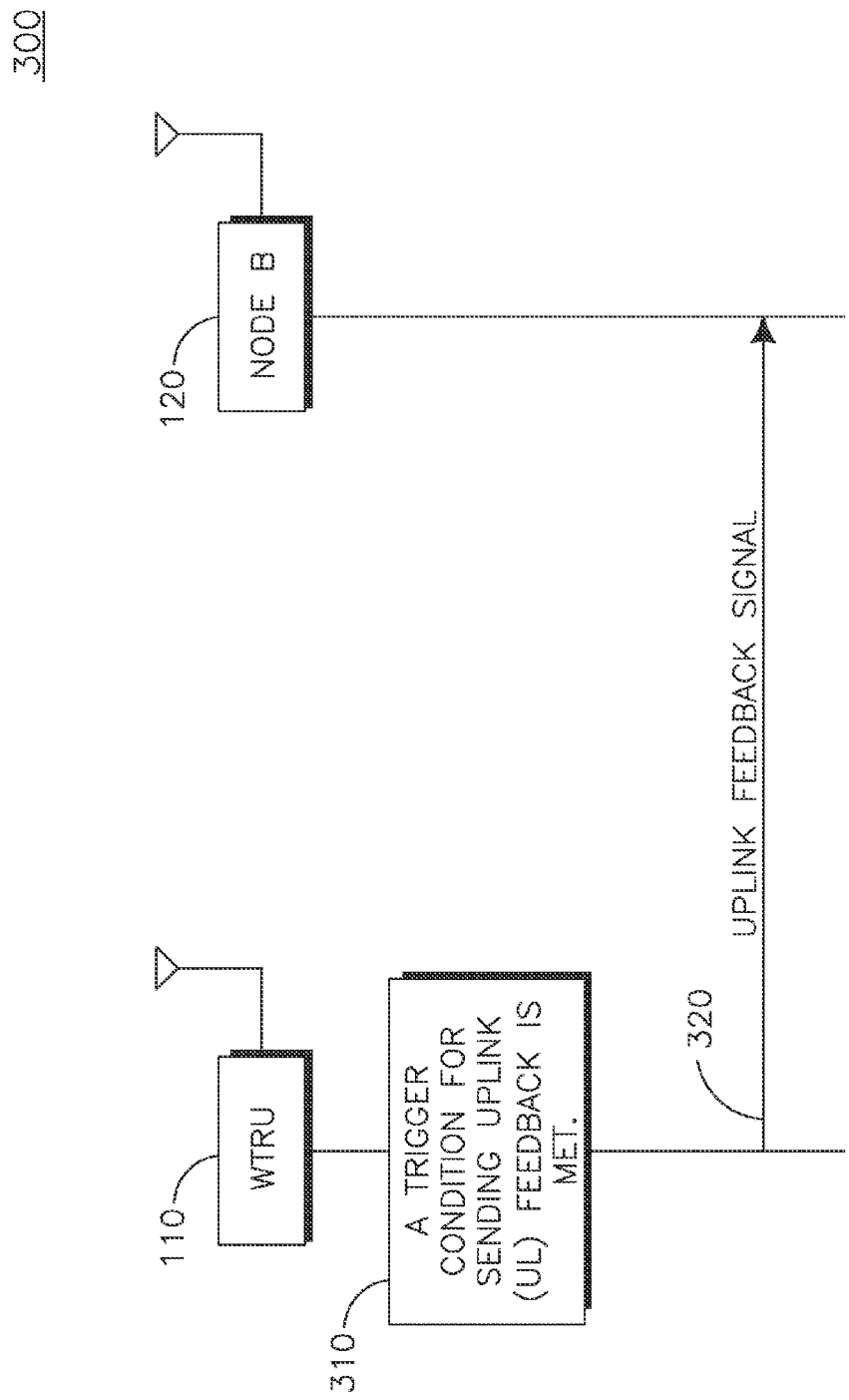
FIG. 3 is an example signal diagram of providing uplink (UL) feedback.

FIG. 3 is an example signal diagram 300 of providing uplink (UL) feedback. When referred to hereinafter, an HS-DSCH serving cell change message may include, but is not limited to, an RRC reconfiguration message or an Active Set Update message that may reconfigure the WTRU 110 to change its serving cell. Also, a "common resource" may include a set of HS-DSCH resources used by one or a group of WTRUs 110 to receive a downlink (DL) message. The common resource may be broadcast or provided and configured by the network via RRC dedicated messaging.

The WTRU 110 and Node B 120 shown in FIG. 3 may be the WTRU 110 of FIG. 1 in communication with the target Node B $120_2$ of FIG. 1. First, it is determined whether or not a trigger condition for sending UL feedback is met (step 310). The trigger may include any of the following events or any combination of the following events:

The WTRU 110 successfully decodes its dedicated H-RNTI over HS-SCCH in the target cell.

The WTRU 110 successfully decodes a common H-RNTI used for the purpose of handover in the target cell.

The WTRU 110 successfully decodes a cyclic redundancy check (CRC) of an HS-DSCH transport block using its dedicated H-RNTI in the case where the handover message was sent in the target cell without HS-SCCH.

The WTRU 110 successfully decodes a CRC of an HS-DSCH transport block using a common H-RNTI used for the purpose of handover in the case where the handover message was sent in the target cell without HS-SCCH.

The WTRU 110 finds its U-RNTI, S-RNTI or any other radio network temporary identifier that is specific to the WTRU in the medium access control (MAC) header of a transport block received in the target cell.

The WTRU 110, on condition that a trigger condition is met in step 310, transmits an uplink feedback signal (320). As shown in FIG. 3, the WTRU 110 may transmit the UL feedback signal 320 to a Node B 120, such as either Node B $120_1$ or Node B $120_2$. However, although the WTRU 110 is depicted as transmitting the UL feedback signal to a Node B 120, it should be noted that the UL feedback may be transmitted to a primary/anchor cell or secondary cell associated with the Node B 120. The UL feedback signal 320 may be in the form of an acknowledgement (ACK) signal and/or a negative ACK (NACK) signal.

For example, the WTRU 110 may transmit an ACK signal if one or any combination of the triggering conditions from step 310 occur and the WTRU 110 successfully decodes the associated HS-DSCH transport block received in the target cell, (e.g., the CRC pass). The WTRU 110 may transmit a NACK signal if one or any combination of the triggering conditions from step 310 occur and the WTRU 110 fails to decode the associated HS-DSCH transport block received in the target cell, (i.e., CRC failure).

In order to transmit the UL feedback signal 320, the WTRU 110 may employ a number of different techniques. For example, the WTRU 110 may use an existing HS-DPCCH channel that currently sends a channel quality indicator (CQI) and ACK/NACK feedback to the source cell, to transmit the UL feedback signal 320 to the target cell.

Figure 4:
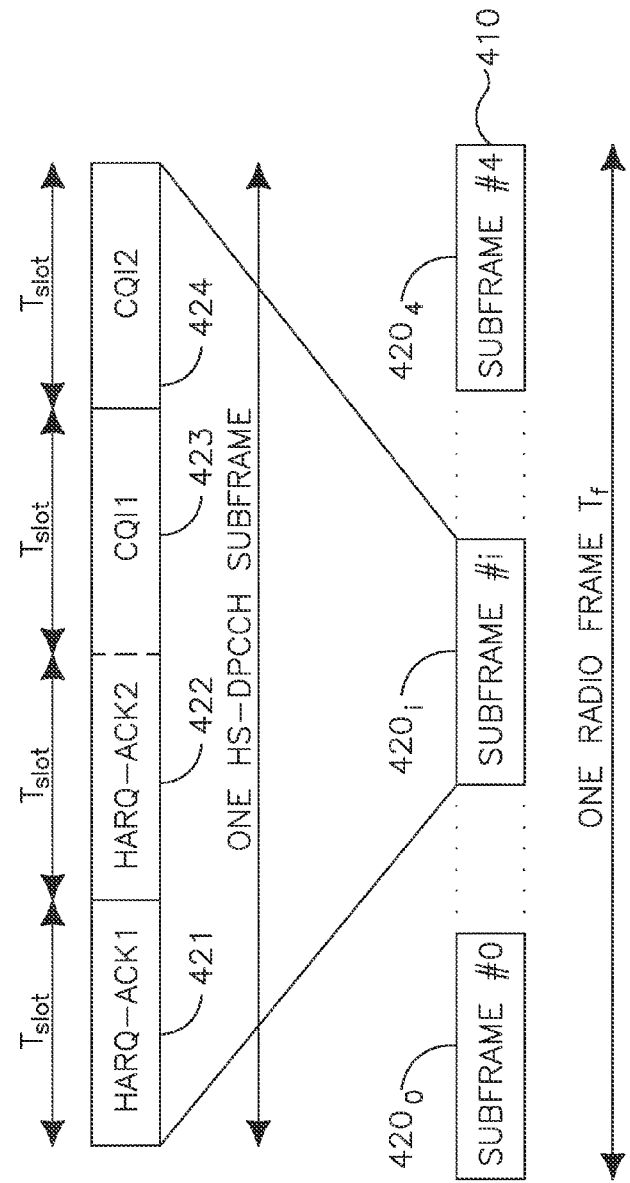
FIG. 4 is an example frame format of a HS-DPCCH frame.

A new HS-DPCCH slot format may also be utilized to send ACK/NACK information to both the source and target cell. FIG. 4 is an example frame format 400 of a HS-DPCCH frame in accordance with this example. As shown in FIG. 4, a radio frame 410 includes one or more subframes 420, such as subframe #0 ($420_0$), subframe #i ($420_i$), and subframe #4 ($420_4$). Within each subframe 420, (e.g., subframe 420), a number of timeslots ($T_{slot}$) may exist. In the example shown in FIG. 4, subframe 420, includes timeslots for HARQ-ACK1 (421), HARQ-ACK2 (422), CQI1 (423), and CQI2 (424). In this example, timeslot 421 may be utilized for HARQ feedback for the source cell/anchor cell, timeslot 422 may be utilized for HARQ feedback for the target cell/secondary serving cell, timeslot 423 may be utilized for a CQI feedback to the source cell/primary serving cell or anchor cell, and timeslot 424 may be utilized for CQI feedback to the target cell/secondary serving cell. It should also be noted that, although two CQI timeslots are shown in FIG. 4, only one may be utilized as well.

In another example for providing UL feedback, the WTRU 110 may utilize a defined UL physical control channel to provide the UL feedback signal 320 to the Node B 120. The WTRU 110 transmits the UL feedback signal 320 using an additional channelization code or second scrambling code. The format of the additional channelization code or scrambling code may be similar to those already defined with the HS-DPCCH to allow the WTRU 110 to send both ACKs, NACKs, and CQI to the target Node B $120_2$. Alternatively, a control channel format may be defined where the WTRU 110 only provides ACK/NACK information to the target Node B $120_2$. The WTRU 110 may also continue to transmit UL feedback to a source, or first serving cell, on an already configured HS-DPCCH control channel.

For example, a defined UL control channel may be configured when a Node B is added to the active set of the WTRU 110 or a secondary cell is configured for multi-cell operation. In this case, the UL control channel may be assigned a UL channelization code or scrambling code for transfer of control information, (e.g., a Node B specific HS-DPCCH). Each Node B 120 may be configured to monitor a different channelization code or scrambling code, and the WTRU 110 may use a different channelization code or scrambling code depending upon which Node B 120 is the target of a handover procedure.

Also, a single channelization code or scrambling code could be configured for sending temporary UL feedback information to any target Node B. The UL channelization code or scrambling code may be pre-configured, signaled through dedicated RRC signaling, (e.g., part of an ACTIVE SET UPDATE message), or signaled as part of the broadcast information in the target cell.

Alternatively, the WTRU 110 may use a common enhanced dedicated channel (E-DCH) in the target cell to transmit the UL feedback signal 320 to the target cell. In one example, this method may be utilized where the target Node B 120 is not yet in the active set of the WTRU 110. In addition, the common E-DCH resource in the target cell could be used for the transmission of data as well as feedback information.

The common E-DCH resources could be the same as those used for E-DCH in the CELL_FACH state defined by the 3GPP standards or a separate common resource, or set of resources, could be defined for the purpose of providing UL feedback. The WTRU 110 may perform a power ramp-up procedure in order to establish proper synchronization of the power control loop. This ramp-up may be similar to the ramp-up defined for E-DCH in the CELL_FACH state.

In another alternative example, the WTRU 110 may use a second UL frequency channel for sending feedback information to the target Node B 120 or secondary cell. In this example, two cells, (e.g., the primary serving cell, or anchor cell, and secondary serving cells), utilize different frequency channels in the uplink direction. Since the WTRU 110 would be transmitting the UL feedback signal 320 on two different frequencies to the two different cells, the WTRU 110 could use the same channelization and/or scrambling code to transmit the feedback information to both cells. The format of the control information using the frequency channel may be similar to an already defined HS-DPCCH to allow the WTRU 110 to transmit both ACKs, NACKs, and CQI to the target cell.

For example, a defined UL control channel may be configured when a Node B is added to the active set of the WTRU 110. In this case, the UL control channel may be assigned a frequency channel or combination of a frequency channel and scrambling code for transfer of control information, (e.g., a cell specific HS-DPCCH). Each Node B 120 may be configured to monitor a different frequency channel or combination of a frequency channel and scrambling code.

Also, a single frequency channel or combination of a frequency channel and scrambling code could be configured for sending temporary UL feedback information to any target Node B. The frequency channel or combination of a frequency channel and scrambling code may be pre-configured, signaled through dedicated RRC signaling, (e.g., part of an ACTIVE SET UPDATE message), or signaled as part of the broadcast information in the target cell.

In another example, UL feedback information may be included medium access control (MAC) processing as part of a MAC header that is used for UL transmission over E-DCH. A MAC control packet data unit (PDU) may be defined to send ACK, NACK, and/or CQI information as part of the MAC processing defined for MAC-e/es or MAC-i/is in the 3GPP standards. Alternatively, the WTRU 110 could include ACK, NACK, and/or CQI information in the MAC header of a UL E-DCH transport block.

The WTRU 110 could also transmit a single CQI value depending on the channel quality on both cells, and/or a single ACK/NACK value depending on the status of the reception of PDUs from both cells. The cells, or radio links, may belong to the same radio link set or share the same transport power command (TPC) combination index and the cells may or may not be operating on the same frequency channel.

The single CQI value could be reported where the CQI is a function of the individual CQI values that the WTRU 110 measures from both cells. For example, the CQI value reported could be the maximum of the two CQI values or the minimum of the two CQI values. It should be noted that although two cells are referred to, any number of cells may be measured and any number of CQI values may be included in the single CQI value reported.

In this manner, the network may determine a cell from the single CQI value to transmit to the WTRU 110. Additionally, the network may utilize the single CQI value to select a modulation and coding scheme (MCS), to use on both cells simultaneously. The WTRU 110 could also indicate which cell is the one with the largest or smallest CQI by adding a flag to the CQI indication, or could indicate the cell with the largest or smallest CQI by selecting a specific channelization code or scrambling code.

Additionally, where a single ACK or NACK value is transmitted, the WTRU 110 typically signals and ACK if a PDU is received successfully from one or both cells, and a NACK if no PDU is received successfully from any cell. In this case, the network could utilize the transmission of a single ACK/NACK to transmit the same PDU over both cells, simultaneously or near simultaneously, to potentially increase the chance that at least one of the PDUs is received successfully. Again, the WTRU 110 could indicate which cell the data was received successfully from by adding a flag to the CQI indication or by indicating it via the selection of channelization or scrambling code.

It should be noted that in any of the cases described above that involve a handover operation from a source cell to a target cell, the source Node B 120 may be restricted from transmitting further downlink traffic to a WTRU 110 that is in handover. This restriction could be signaled to the Node B 120 via an Iub message from a radio network controller (RNC).

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU), comprising:
a processor configured to:
when the WTRU is configured with a plurality of serving cells,
concatenate hybrid automatic repeat requests (HARQ) information associated with a first serving cell with HARQ information associated with a second serving cell;
concatenate channel quality indicator (CQI) information associated with the first serving cell with CQI information associated with the second serving cell; and
send the concatenated HARQ information and the concatenated CQI information in a same subframe using a high speed dedicated physical control channel (HS-DPCCH).

2. The WTRU of claim 1, wherein the plurality of serving cells comprise a plurality of serving dedicated high speed downlink shared channel (HS-DSCH) cells.

3. The WTRU of claim 1, wherein the first serving cell is a primary HS-DSCH serving cell, and the second serving cell is a secondary HS-DSCH serving cell.

4. The WTRU of claim 1, wherein the processor is configured to channel code for the HARQ information associated with the first serving cell and the HARQ information associated with the second serving cell using a same channelization code.

5. The WTRU of claim 1, wherein the processor is configured to channel code the CQI information associated with the first serving cell and the CQI information associated with the second serving cell using a same channelization code.

6. The WTRU of claim 1, wherein the processor is configured to use a same scrambling code for sending the HARQ information associated with the first serving cell and the HARQ information associated with the second serving cell.

7. The WTRU of claim 1, wherein the processor is configured to use a same scrambling code for sending the CQI information associated with the first serving cell and the CQI information associated with the second serving cell.

8. The WTRU of claim 1, wherein the processor is configured to send the CQI information associated with the first serving cell and the CQI information associated with the second serving cell in two time slots.

9. A method for sending feedback, the method comprising:
when the WTRU is configured with a plurality of serving cells,
concatenating hybrid automatic repeat requests (HARQ) information associated with a first serving cell with HARQ information associated with a second serving cell;
concatenating channel quality indicator (CQI) information associated with the first serving cell with CQI information associated with the second serving cell; and
sending the concatenated HARQ information and the concatenated CQI information in a same subframe using a high speed dedicated physical control channel (HS-DPCCH).

10. The method of claim 9, wherein the plurality of serving cells comprise a plurality of serving dedicated high speed downlink shared channel (HS-DSCH) cells.

11. The method of claim 9, wherein the first serving cell is a primary HS-DSCH serving cell, and the second serving cell is a secondary HS-DSCH serving cell.

12. The method of claim 9, further comprising:
channel coding the HARQ information associated with the first serving cell and the HARQ information associated with the second serving cell using a same channelization code.

13. The method of claim 9, further comprising:
channel coding the CQI information associated with the first serving cell and the CQI information associated with the second serving cell using a same channelization code.

14. The method of claim 9, further comprising:
using a same scrambling code for sending the HARQ information associated with the first serving cell and the HARQ information associated with the second serving cell.

15. The method of claim 9, further comprising:
using a same scrambling code for sending the CQI information associated with the first serving cell and the CQI information associated with the second serving cell.

16. The method of claim 9, wherein the CQI information associated with the first serving cell and the CQI information associated with the second serving cell are sent in two time slots.

17. The method of claim 9, wherein the CQI information associated with the first serving cell and the CQI information associated with the second serving cell are sent in different time slots.

* * * * *